United States Patent
Bourhis et al.

(10) Patent No.: US 12,163,469 B2
(45) Date of Patent: Dec. 10, 2024

(54) MODULE ENSURING AN ATTENUATION OF SOUND WAVES AND A HEAT EXCHANGE

(71) Applicant: Airbus Operations SAS, Toulouse (FR)

(72) Inventors: Arnaud Bourhis, Toulouse (FR);
Florian Ravise, Toulouse (FR);
Maxime Zebian, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 225 days.

(21) Appl. No.: 17/979,023

(22) Filed: Nov. 2, 2022

(65) Prior Publication Data
US 2023/0138228 A1 May 4, 2023

(30) Foreign Application Priority Data
Nov. 4, 2021 (FR) ...................... 2111740

(51) Int. Cl.
*F02C 7/045* (2006.01)
*F02C 7/24* (2006.01)
*B32B 3/12* (2006.01)
*B64D 33/02* (2006.01)

(52) U.S. Cl.
CPC ............ *F02C 7/045* (2013.01); *F02C 7/24* (2013.01); *B32B 3/12* (2013.01); *B64D 2033/0206* (2013.01); *F05D 2250/283* (2013.01); *F05D 2260/96* (2013.01); *F28F 2265/28* (2013.01)

(58) Field of Classification Search
CPC ... F02C 7/045; F02C 7/24; B32B 3/12; B32B 2605/18; B32B 3/085; B32B 3/266; B32B 3/30; B64D 2033/0206; B64D 33/02; B64D 2033/024; F05D 2250/283; F05D 2260/96; F28F 2265/28; F28F 7/02; E04B 2001/748; E04B 2001/8433; E04B 2001/8485;
(Continued)

(56) References Cited

U.S. PATENT DOCUMENTS

| | | | |
|---|---|---|---|
| 6,811,372 B1 * | 11/2004 | Emborg | G10K 11/172 415/196 |
| 9,127,452 B1 * | 9/2015 | Winfield | F02K 1/827 |
| 2011/0126544 A1 | 6/2011 | Foster | |

(Continued)

FOREIGN PATENT DOCUMENTS

FR  2960334 A1  11/2011

OTHER PUBLICATIONS

French Search Report dated Jun. 23, 2022; priority document.

*Primary Examiner* — Gerald L Sung
*Assistant Examiner* — Rene D Ford
(74) *Attorney, Agent, or Firm* — Greer, Burns & Crain, Ltd.

(57) ABSTRACT

A module ensuring an acoustic attenuation of a flow of a first fluid and a heat exchange between the first fluid and a second fluid. The module comprises a perforated first wall with a cutout, a second wall, a cellular structure extending from the second wall to the first wall, a recess provided in the cellular structure between a perforated bottom and a perforated top, and a heat exchanger which is fixed inside the recess between the bottom and the top and in which the second fluid circulates. Such a module ensures an attenuation of sound waves and a heat exchange without limiting the attenuation surface.

10 Claims, 3 Drawing Sheets

(58) Field of Classification Search
CPC ... E04B 1/86; Y02T 50/60; B64F 5/10; G10K 11/168; G10K 11/172; F28D 2021/0021
See application file for complete search history.

(56) References Cited

U.S. PATENT DOCUMENTS

| | | | |
|---|---|---|---|
| 2012/0048389 A1* | 3/2012 | Chelin | B64D 15/04 137/15.1 |
| 2013/0142624 A1 | 6/2013 | Julliard et al. | |
| 2013/0292202 A1* | 11/2013 | Moutier | B64F 5/40 181/292 |
| 2014/0034414 A1* | 2/2014 | Burkett | B64D 15/12 219/205 |
| 2016/0017810 A1* | 1/2016 | Lord | E04B 1/84 60/725 |
| 2017/0122204 A1* | 5/2017 | Versaevel | F02C 7/045 |
| 2019/0118955 A1* | 4/2019 | Porte | B64D 29/00 |
| 2020/0122843 A1* | 4/2020 | Porte | B64D 15/04 |
| 2020/0122852 A1* | 4/2020 | Zebian | F02K 1/827 |
| 2020/0276641 A1* | 9/2020 | Benard | F02C 7/047 |
| 2020/0309029 A1* | 10/2020 | Boileau | F02C 7/045 |
| 2021/0371118 A1* | 12/2021 | Porte | B32B 7/12 |

\* cited by examiner

MODULE ENSURING AN ATTENUATION OF SOUND WAVES AND A HEAT EXCHANGE

CROSS-REFERENCES TO RELATED APPLICATIONS

This application claims the benefit of the French patent application No. 2111740 filed on Nov. 4, 2021, the entire disclosures of which are incorporated herein by way of reference.

FIELD OF THE INVENTION

The present invention relates to a module ensuring an attenuation of sound waves generated by the flow of a first fluid and also allowing a heat exchange between this first fluid and a second fluid, to a method for producing such a module, to an aircraft nacelle comprising such modules, and also to an aircraft having such a module.

BACKGROUND OF THE INVENTION

A turbomachine of an aircraft, in particular a bypass turbomachine, has an air duct which opens at the front and through which fresh air enters the turbomachine. The air duct is delimited by walls which channel the air. A portion of the air is used to carry out a heat exchange with fluids of the aircraft. To this end, heat exchangers are fitted at the walls.

The inside of the duct is also lined with structures ensuring an attenuation of sound waves generated by the flow of air in the duct and thus allowing the noise of the turbomachine to be attenuated. Such structures generally comprise a perforated wall which is oriented towards the inside of the duct and at the rear of which a set of in particular honeycomb-shaped cavities is disposed. The cavities form quarter-wave resonators which attenuate a particular frequency.

An implementation of heat exchangers at the walls of the duct decreases the space assigned to the acoustic structures, this possibly leading to an increase in the noise of the turbomachine, and it is therefore necessary to fit a structure which ensures both an attenuation of sound waves and a heat exchange without limiting the attenuation surface.

SUMMARY OF THE INVENTION

An object of the present invention is to propose a module ensuring an attenuation of sound waves generated by the flow of a first fluid and a heat exchange between this first fluid and a second fluid.

To that end, there is proposed a module ensuring an acoustic attenuation of a flow of a first fluid and a heat exchange between the first fluid and a second fluid, the module comprising:
a first wall which is perforated, along which the first fluid flows and which has a cutout,
a second wall,
a cellular structure delimiting cells which extend from the second wall to the first wall, and having a first end secured to the second wall and a second end,
a recess provided in the cellular structure and delimited between a bottom and a top which are perforated, wherein the top closes off the cutout, wherein the bottom extends at a distance from the top, wherein, outside the recess, the second end of the cellular structure is secured to the first wall and wherein, at the recess, the second end of the cellular structure is secured to the bottom, and
a heat exchanger which is fixed inside the recess between the bottom and the top and in which the second fluid circulates.

Such a module ensures an attenuation of sound waves and a heat exchange without limiting the attenuation surface.

Advantageously, the heat exchanger comprises pipes which meander through the recess, a supply pipe which channels the second fluid from its zone of use as far as the pipes, and an extraction pipe which channels the second fluid from the pipes as far as its zone of use.

Advantageously, the supply pipe and the extraction pipe pass through the cellular structure, the bottom and the second wall through a bore.

Advantageously, the module comprises, for each supply pipe and extraction pipe, a seal which is positioned around the pipe and which closes off the bore at the bottom and at the second wall.

Advantageously, the module comprises an edge which is fixed around the bottom and which extends from the bottom as far as the top.

Advantageously, the module comprises foam between the edge and the cellular structure.

According to a particular embodiment, the module has, along the periphery of the top, a gap between the edge and the top, and a mastic is deposited so as to close off the gap.

According to a particular embodiment, the top overlaps the edge with formation of a joggle.

The invention also proposes a method for producing a module according to the preceding variant, the method comprising:
a first provision step during which the cellular structure is provided,
a shaping step during which the cellular structure thus provided is shaped so as to produce the recess,
a second provision step during which a shell comprising the perforated bottom is provided,
a first fixing step during which the shell is fixed in the recess,
a third provision step during which the first wall which is perforated and cut according to the cutout is provided,
a fourth provision step during which the second wall is provided,
a second fixing step during which the first wall and the second wall are fixed on either side of the cellular structure,
a fifth provision step during which the exchanger is provided,
a third fixing step during which the exchanger is fixed in the recess,
a sixth provision step during which the perforated top is provided, and
a fourth fixing step during which the top is fixed above the exchanger so as to close off the recess.

The invention also proposes a nacelle of an aircraft comprising an external wall and an internal wall delimiting an air duct and wherein the external wall and/or the internal wall bear at least one module according to one of the preceding variants and wherein the first wall is oriented towards the inside of the duct.

BRIEF DESCRIPTION OF THE DRAWINGS

The features of the invention mentioned above, along with others, will become more clearly apparent upon reading the following description of an exemplary embodiment, the description being given with reference to the appended drawings, in which.

DETAILED DESCRIPTION OF THE PREFERRED EMBODIMENTS

Figure 1:
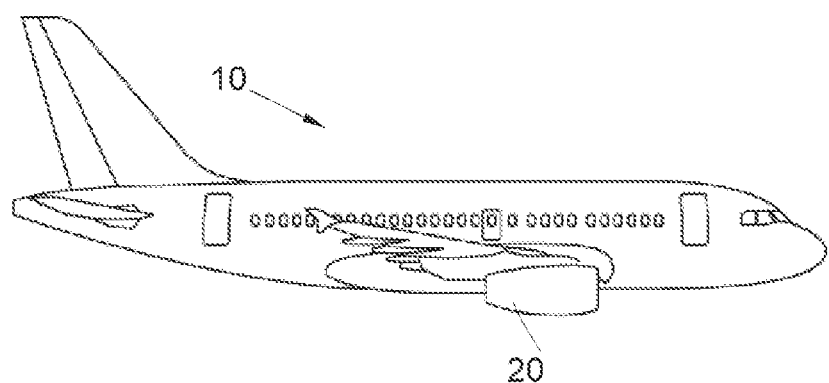
FIG. 1 is a side view of an aircraft according to the invention.

FIG. 1 shows an aircraft 10 which has a nacelle 20 inside which a turbomachine is disposed. Arranged inside the nacelle 20 is an air duct which passes through the nacelle and the turbomachine. The air duct is thus delimited by an external wall (also referred to as OFS, "outer fixed structure") and an internal wall (also referred to as IFS, "internal fixed structure") of the nacelle 20.

Figure 2:
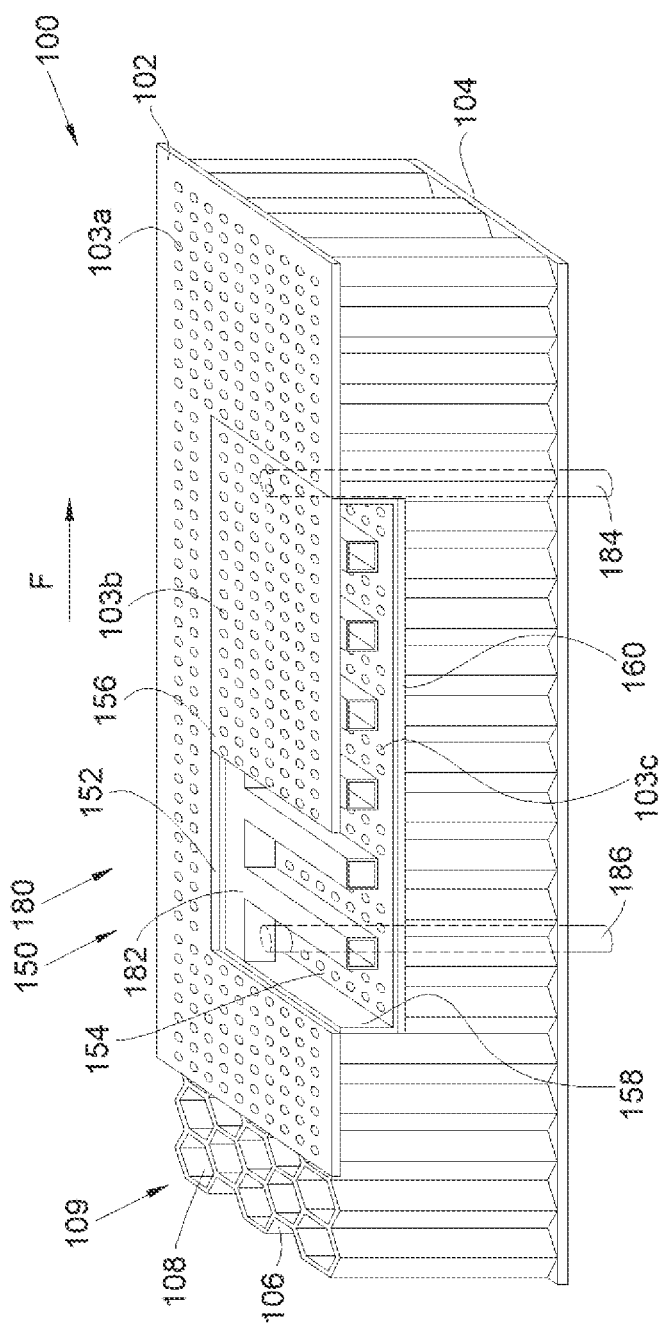
FIG. 2 is a perspective view of a module according to the invention.

FIG. 2 shows a module 100 according to the invention which ensures, on the one hand, an acoustic attenuation of noises generated by a first fluid flowing along this module 100, and, on the other hand, a heat exchange between the first fluid and a second fluid circulating inside this module 100.

Such a module 100 can be fitted at the external wall and/or at the internal wall of the nacelle 20 or in another environment as long as it is necessary to attenuate the noise generated by the flow of a first fluid and to carry out a heat exchange between the first fluid and a second fluid. Such a module 100 lines the surface of the wall to which it is fixed and there may be several of these modules 100 borne by the wall. In the embodiment of the invention shown in FIG. 2, the module is in the shape of a block, but it may have a different shape so as to be adapted to the geometry of the wall to which it is fixed.

The module 100 comprises a first wall 102 (cut on the left) which is perforated and therefore passed through by holes 103a, and a second wall 104 at a distance from and, in this case, parallel to the first wall 102.

The first wall 102 is in contact with the first fluid, in particular a gas, which flows in the duct along the first wall 102 and which is represented in this case by the arrow F.

The second wall 104 is solid and fixed to the wall which delimits the duct.

The module 100 also comprises a plurality of intermediate walls 106 which extend from the second wall 104 to the first wall 102. In the embodiment of the invention shown here, the intermediate walls 106 extend perpendicularly with respect to the first wall 102 and to the second wall 104.

The intermediate walls 106 are disposed, and secured, relative to one another so as to form cells 108, which in this case have a hexagonal section and extend from the second wall 104 to the first wall 102. Each cell 108 has a first end secured to the second wall 104 and a second end.

The intermediate walls 106 thus together define a cellular structure 109 which has a first end secured to the second wall 104 and a second end.

The first wall 102 has a cutout 152, which in this case has a rectangular shape.

The module 100 comprises a recess 150 provided in the cellular structure 109 and delimited between a bottom 154 and a top 156.

The top 156 (cut in this case on the left) closes off the cutout 152 and is also perforated and therefore passed through by holes 103b. In order to limit the aerodynamic impacts, the top 156 and the first wall 102 are overall aligned.

The bottom 154 extends at a distance from the top 156, and in this case parallel thereto, and it is recessed inside the module 100 towards the second wall 104. In this case, the bottom 154 covers the same surface area as the top 156 overall. The bottom 154 is also perforated and therefore passed through by holes 103c.

Outside the recess 150, the second end of each cell 108 and therefore the second end of the cellular structure 109 are secured to the first wall 102 and, at the recess 150, the second end of each cell 108 and therefore the second end of the cellular structure 109 are secured to the bottom 154. The intermediate walls 106 are therefore shorter at the recess 150 than outside the recess 150.

In the case of a flow of the first fluid, preferably a gas, in the duct, the first wall 102 is oriented towards the inside of the duct. The first fluid, which is air in this case, flows along the first wall 102, and the holes 103a-c ensure that a portion of the air enters the cells 108 and therefore sound waves generated by the flow of air are attenuated. Depending on the position, the air passes through the first wall 102 or the top 156 and the bottom 154 before reaching a cell 108.

The fact that the cells 108 are secured relative to one another even under the recess 150 makes it possible to ensure that the module 100 constitutes a structural element.

The module 100 also comprises a heat exchanger 180 which is fixed inside the recess 150 between the bottom 154 and the top 156 and in which a second fluid, which may be, for example, oil of the turbomachine and which is cooled by heat exchange with the first fluid through the heat exchanger 180, circulates. The heat exchanger 180 is fixed, for example, with the aid of inserts which are implanted in the cellular structure 109 and clamping screws which cooperate with these inserts.

The heat exchanger 180 in this case comprises pipes 182 which meander through the recess 150.

In order to ensure the circulation of the second fluid in the pipes 182, the heat exchanger 180 comprises a supply pipe 184 which channels the second fluid from its zone of use as far as the pipes 182, and an extraction pipe 186 which channels the second fluid from the pipes 182 as far as its zone of use.

In the embodiment of the invention shown in FIG. 2, the supply pipe 184 and the extraction pipe 186 pass through the cellular structure 109, the second wall 104 and the bottom 154 through bores which are provided for that purpose.

The heat exchanger 180 is thus integrated into the module 100 without reducing the surface area associated with the acoustic attenuation, while still ensuring the rigidity of the module due to the presence of the cells 108 over the entire surface of the module 100.

In the embodiment of the invention shown in FIG. 2, there is a single recess 150 and a single heat exchanger 180, but it is possible to have several recesses 150 provided inside the same module 100 and to have one heat exchanger 180 per recess 150.

A method for producing such a module 100 comprises, for example, a first provision step during which the cellular structure 109 is provided. The production method continues with a shaping step during which the cellular structure 109 thus provided is shaped so as to produce the recess 150 and the potential bores which are provided in the bottom 154 for the passage of the supply pipe 184 and the extraction pipe 186 and inserts for fixation of the heat exchanger 180. The cellular structure 109 is for example made of metal (aluminum and its alloys, titanium and its alloys) or of synthetic fibers (Nomex®, Kevlar®). Before the provision of the bores, a resin may be injected in the cells in which the bores will be provided, in order to facilitate the machining.

The method comprises a second provision step during which a shell is provided. The shell comprises the perforated bottom 154 pierced with the potential bores for the passage of the supply pipe 184 and the extraction pipe 186 and inserts for fixation of the heat exchanger 180. The shell may also comprise guides for the subsequent fitting of the heat exchanger 180.

In the embodiment of the invention shown in FIG. 2, the shell also comprises an edge 158 which is fixed around the bottom 154 and which extends from the bottom 154 as far as the top 156 so as to laterally delimit the recess 150.

The shell is for example made of metal (aluminum and its alloys, titanium and its alloys) or of composite materials.

The method then comprises a first fixing step during which the shell is fixed in the recess 150. The shell is fixed, for example, by adhesive bonding of the bottom 154 to the cellular structure 109 using a crosslinked adhesive. The crosslinking of the adhesive may be effected directly on the shell or on the cellular structure 109.

In order to absorb the dimensional tolerances and the expansions between the shell and the cellular structure 109, intumescent adhesive which expands during polymerization is injected between the edge 158 and the cellular structure 109.

Optionally, a perforated sheet 160 constituting thermal protection is fixed between the cellular structure 109 and the bottom 154. The perforated sheet 160 is, for example, a carbon sheet.

The method comprises a third provision step during which the first wall 102 which is perforated and cut according to the cutout 152 is provided. The first wall 102 is for example made of metal (aluminum and its alloys, titanium and its alloys) or of composite materials.

The method comprises a fourth provision step during which the second wall 104 is provided. The second wall 104 is for example made of metal (aluminum and its alloys, titanium and its alloys, steel and its alloys) or of composite materials.

The method then comprises a second fixing step during which the first wall 102 and the second wall 104 are fixed, for example by adhesive bonding, on either side of the cellular structure 109. The first wall 102 is fixed on the side of the recess 150 by aligning the cutout 152 with the recess 150, and the second wall 104 is fixed on the side opposite to the recess 150.

The method comprises a fifth provision step during which the exchanger 180 is provided, and a third fixing step during which the exchanger 180 is fixed in the recess 150, potentially by making the supply pipe 184 and the extraction pipe 186 pass through the cellular structure 109.

The method comprises a sixth provision step during which the perforated top 156 is provided, and a fourth fixing step during which the top 156 is fixed above the exchanger 180 so as to close off the recess 150.

Thermal protection may potentially be fixed against the second wall 104.

Figure 3:
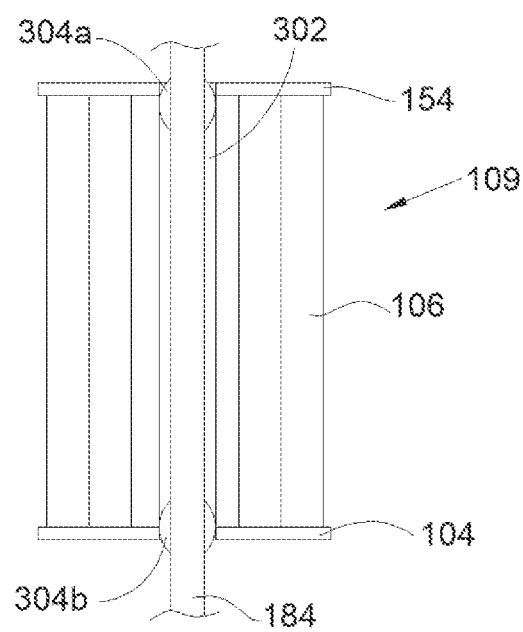
FIG. 3 is a view in section at a pipe passing through a cellular structure of the module according to the invention.

FIG. 3 shows an exemplary arrangement at the supply pipe 184, but a similar arrangement can be produced for the extraction pipe 186.

A bore 302 is produced through the cellular structure 109, and also the bottom 154 and the second wall 104, and the supply pipe 184 is accommodated in the bore 302.

If thermal protection is fixed against the second wall 104, the bore 302 also passes through the thermal protection.

In order to ensure tightness at the bottom 154 and at the second wall 104, the module comprises a seal 304*a-b* which is positioned around the supply pipe 184 and which closes off the bore 302 at the bottom 154 and respectively at the second wall 104.

Each seal 304*a-b* is for example made of silicone which is reinforced, if required, with ceramic materials and glass fibers.

According to a particular embodiment, the extent of the top 156 is smaller than the extent of the edge 158 of the shell. The module 100 then has, along the periphery of the top 156, a gap between the edge 158 and the top 156. In order to close off this gap, a mastic is deposited so as to close off and seal the gap. This mastic also makes it possible to absorb geometric variations due to thermal expansions.

According to another particular embodiment, the extent of the top 156 is greater than the extent of the edge 158 of the shell and the top 156 then overlaps the edge 158 with formation of a joggle in order to limit the aerodynamic impact. The joggle formation consists in bridging the vertical gap between the top 156 and the edge 158 with a doubly bent surface which is flush with the top 156 and the edge 158 and which is realized, for example, with a mastic.

Any other shapes that make it possible to reduce the aerodynamic disruption can be used, such as a chamfer.

The top 156 is fixed, for example, with the aid of clamping screws which screw through the top 156 into holes which are provided for that purpose. The holes are advantageously oblong holes oriented in different orientations in order to absorb geometric variations of the top 156 due to thermal expansions.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A module ensuring an acoustic attenuation of a flow of a first fluid and a heat exchange between the first fluid and a second fluid, the module comprising:
   a first wall which is perforated, along which said first fluid flows and which has a cutout,
   a second wall,
   a cellular structure delimiting cells which extend from the second wall to the first wall, and having a first end secured to the second wall and a second end,
   a recess provided in the cellular structure and delimited between a bottom and a top which are perforated, wherein the top closes off the cutout, wherein the bottom extends at a distance from the top, wherein, outside the recess, the second end of the cellular structure is secured to the first wall and wherein, at the recess, the second end of the cellular structure is secured to the bottom, and a heat exchanger which is fixed inside the recess between the bottom and the top and in which the second fluid circulates.

2. The module according to claim 1, wherein the heat exchanger comprises pipes which meander through the recess, a supply pipe which channels the second fluid from its zone of use as far as the pipes, and an extraction pipe which channels the second fluid from the pipes as far as its zone of use.

3. The module according to claim 2, wherein the supply pipe and the extraction pipe pass through the cellular structure, the bottom and the second wall through a bore.

4. The module according to claim 3, further comprising, for each supply pipe and extraction pipe, a seal which is positioned around said supply pipe or extraction pipe and which closes off the bore at the bottom and at the second wall.

5. The module according to claim 1, further comprising an edge which is fixed around the bottom and which extends from the bottom as far as the top.

6. The module according to claim 5, further comprising foam between the edge and the cellular structure.

7. The module according to claim 5, further comprising, along a periphery of the top, a gap between the edge and the top, and wherein a mastic is deposited so as to close off the gap.

8. The module according to claim 5, wherein the top overlaps the edge with formation of a joggle.

9. A method for producing a module according to claim 1, wherein said method comprises:
   providing the cellular structure in a first provision step,
   shaping the cellular structure in a shaping step to produce the recess,
   providing a shell comprising the perforated bottom in a second provision step,
   fixing the shell in the recess in a first fixing step,
   providing the first wall which is perforated and cut according to the cutout in a third provision step,
   providing the second wall in a fourth provision step,
   fixing the first wall and the second wall on either side of the cellular structure in a second fixing step,
   providing the exchanger in a fifth provision step,
   fixing the exchanger in the recess, in a third fixing step,
   providing the perforated top in a sixth provision step, and
   fixing the top above the exchanger to close off the recess in a fourth fixing step.

10. A nacelle of an aircraft comprising:
   an external wall, and
   an internal wall delimiting an air duct,
   wherein at least one of the external wall or the internal wall bear at least one module according to claim 1, and
   wherein the first wall is oriented towards an inside of the duct.

* * * * *